May 5, 1959 T. G. MARSHALL, JR 2,885,564

LOGICAL CIRCUIT ELEMENT

Filed March 7, 1957

INVENTOR
TEMPLE G. MARSHALL, JR.

BY Louis A Kline
Albert L. Sessler, Jr
HIS ATTORNEYS 2,885,564

LOGICAL CIRCUIT ELEMENT

Temple G. Marshall, Jr., Dayton, Ohio, assignor to The National Cash Register Company, Dayton, Ohio, a corporation of Maryland Application March 7, 1957, Serial No. 644,676

15 Claims. (Cl. 250—213)

This invention relates to a novel logical circuit element and more particularly to a circuit element comprising a plurality of electro-optical devices arranged to form electrical switching gates which may be used in logical circuitry, such as that found, for example, in computing apparatus.

It is well known to use vacuum tubes as gating elements for transmission of a signal in response to a certain predetermined combination of input conditions applied to the gate. Depending upon the response desired from the input conditions, these gates can operate as "and" gates, "or" gates, and "not" gates. In an "and" gate, a signal is transmitted only when a signal is received simultaneously from all of the inputs. In an "or" gate, a signal is transmitted when a signal is received from any one of the inputs. In a "not" gate, the conjunction of signals at certain of the inputs to produce an output signal is inhibited by the presence of a signal at an inhibitory input to prevent the generation of an output signal.

Generally speaking, the present invention pertains to circuit elements in which electroluminescent members are optically coupled to photoconductive members in such manner that an electrical input signal applied to the electroluminescent member causes radiation, which radiation impinges on the photoconductive cell to change its operating characteristics. Electroluminescence is a well-known property of certain phosphors which causes them to emit radiation when excited by a change in potential gradient across the phosphors. As is also well known, illumination of a photoconductive cell greatly affects the electrical internal resistance of such a cell. A cell which is dark has a very high resistance, while one which is illuminated has a relatively very low electrical resistance. Circuit elements may therefore be designed which cause a given input into one or more electroluminescent cells to produce various types of outputs from circuits containing photoconductive cells which have been coupled optically to the electroluminescent cells, according to the manner in which these photoconductive cells are combined in said circuits. The input circuits to the electroluminescent cells and the circuits which include the photoconductive cells may be completely electrically isolated if desired, the only coupling between the two being radiation from the electroluminescent cells which illuminates corresponding photoconductive cells.

The novel circuit elements of the present invention have several important advantages over crystal diodes, vacuum tubes, or magnetic components when employed in various types of switching circuits. The elements may be made by relatively simple and inexpensive manufacturing processes and therefore have a low ultimate cost. Their power requirements are very modest, and no problem of heat dissipation arises from their use. They are extremely compact in size, and large numbers may readily be used in various combinations. This type of logical circuit element or switching element, which is capable of having its input circuits and its output circuits electrically isolated, has many advantages over prior types of logical circuit elements in which the input and output circuits were part of a single electrical circuit. One of these advantages is that, while the input circuits operate on alternating currents, the output circuits may be arranged to operate on either alternating current or direct current. Another advantage is that separate values of voltage may be used for the input and output circuits to enable them to be matched with the external circuits with which they are to work. A further advantage is that there may be complete independence between the input and output impedances of the novel circuit elements. An additional advantage is that a large number of inputs may be provided for a single switching element without having an adverse effect upon the operation of said switching element. A further advantage of the novel logical circuit elements of the present invention is their versatility, in that they may be used to drive a large variety of devices.

Accordingly, an object of the invention is to provide an improved logical circuit element.

Another object is to provide efficient and inexpensive circuit elements which may be used in a wide variety of switching circuits, to form logical gating and other switch circuitry.

A further object is to provide a multiple-cell switching circuit having optically-coupled elements to produce an output signal in response to certain predetermined combinations of input signals.

An additional object is to provide a logical circuit element in which the input circuits and the output circuits are electrically isolated.

Still a further object is to provide a logical circuit element in which a large number of inputs may be provided for a single circuit element without adverse effect on the operation of said element.

Other objects of the invention will become apparent from the following description and claims and the accompanying drawing, which discloses, by way of example, certain preferred embodiments of the invention.

Figures 1, 2:
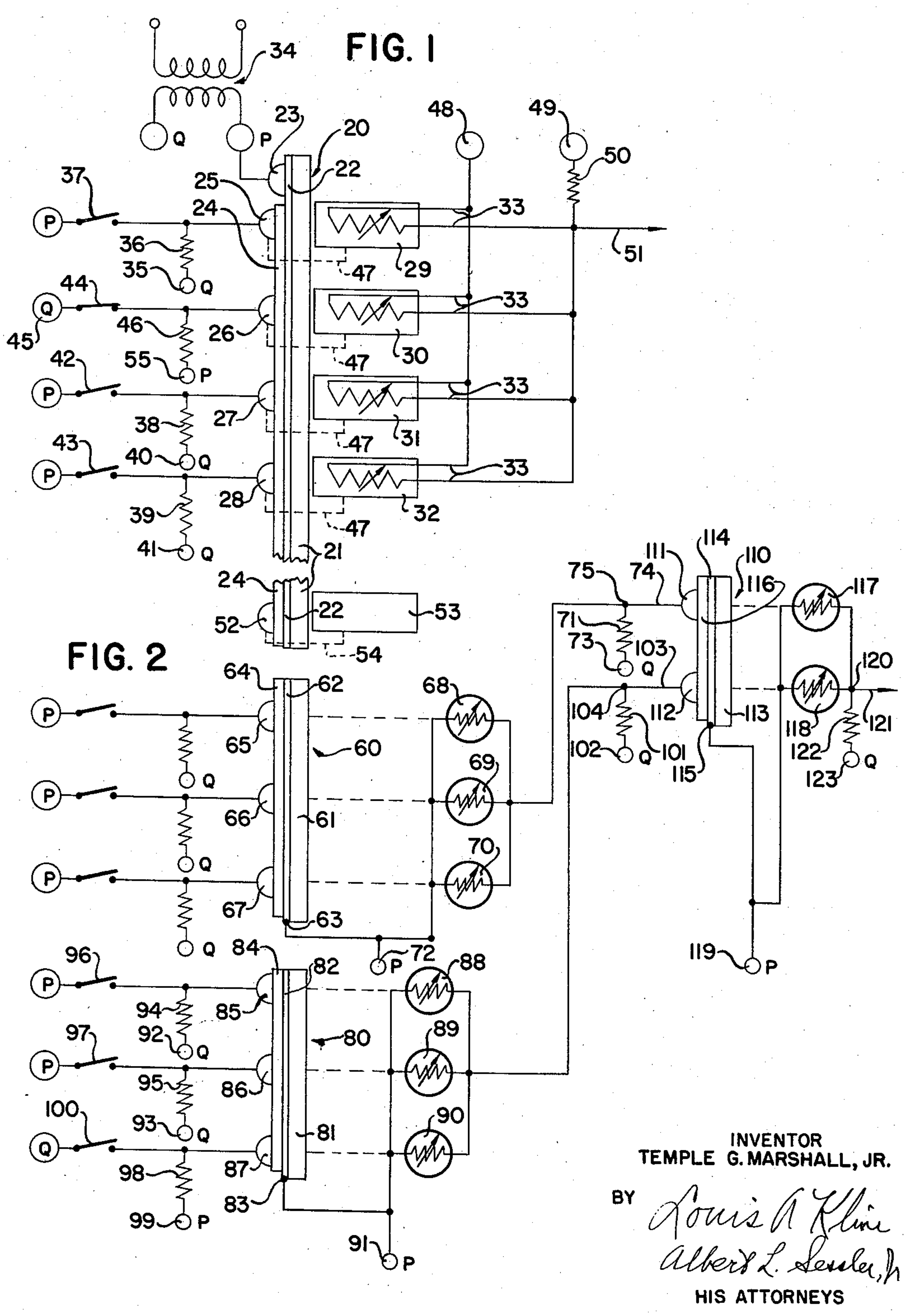
Fig. 1 is a diagrammatic view showing an electro-optical switching element embodied in a novel gating circuit in which said element functions as an "and" gate.
Fig. 2 is another diagrammatic view showing a combination of electro-optical elements of the type shown in Fig. 1 embodied in a circuit in which the elements are combined and function as "and," "or," and "not" gates.

Referring to Fig. 1, there is shown a logical circuit element 20 comprising a base 21 of transparent non-conducting material such as glass. On one side of the base 21 is a layer 22 of transparent electrically-conductive material, to which is secured a terminal 23 for enabling a connection to be made to the conducting layer 22. Over the layer 22 is a layer or coating 24 of electroluminescent material, which may be of the zinc sulphide copper activated type of phosphor. If desired, this coating 24 may take the form of a transparent or translucent dielectric binder in which are embedded multitudinous particles of an electroluminescent phosphor of the above type. Other suitable suitable materials may be used if desired. A plurality of input terminals 25 to 28 inclusive are shown secured to the layer 24 of the electroluminescent material. The coating 24 may be applied as a continuous layer, as shown, or may be applied as discrete areas corresponding to the input terminals.

On the other side of the base 21 is a photoconductive material, such as cadmium sulphide, which may be in the form of individual cells 29 to 32 inclusive, each composed of a single crystal of cadmium sulphide, as shown in Fig. 1, or which may be in the form of a layer consisting of a polycrystalline film of cadmium sulphide or other sulphide. A pair of leads 33 extend from each of the photoconductive cells 29 to 32 inclusive, Any appropriate means of manufacture may be used to produce the circuit element 20. The various layers could, if desired, be deposited, one on the other, by vacuum deposit means, or standard printing techniques might be modified to produce such elements quickly and cheaply.

The manner in which the circuit element 20 may be embodied in a novel "and" gate circuit will now be described. Certain representative values of voltage, frequency, wave shape and impedance are given in this description. It should be realized that these values are merely illustrative and that the invention is in no wise limited by or restricted to them, since other appropriate values may be used where desired or necessary.

The input portion of the element 20 is operated by a 60-cycle sinusoidal voltage of approximately 250 volts R.M.S. derived from the secondary of a transformer 34, the ends of the transformer being indicated as "P" and "Q" to enable the instantaneous potentials to be identified. In the circuit diagram, those points labeled "P" are in phase, and those points labeled "Q" are 180 degrees out of phase with the points P. Therefore there will be a potential difference between points P and Q, but none between points labeled with the same letter. Accordingly, with the terminal 23 connected to point P and a terminal 35 connected to point Q, current will flow in a circuit from point P over terminal 23, through the conducting layer 22, the phosphor layer 24, the terminal 25, and a resistor 36, of approximately 4.7 megohms, to the terminal 35, which is connected to terminal Q. This current will cause the electroluminescent layer 24 to glow at a point where the terminal 25 is connected thereto. The area of joinder of the terminal 25 with the layer 24 in the instant embodiment is approximately 3/16 of an inch in diameter and of circular configuration, and the current path through the phosphor layer in this area has an impedance which has been found to be approximately 150 megohms.

Any desired arrangement may be employed for supplying input signals to the terminal 25, and, in order to explain the operation of the device, a diagrammatic arrangement for this purpose is shown in Fig. 1. This arrangement includes a switch 37, by which the potential of point P can be supplied directly to the terminal 25 to short out the path through the electroluminescent layer 24 and cause it to cease glowing.

Circuits similar to that described above for the terminal 25 for causing and controlling energization of the phosphor layer 24 are provided for the terminals 27 and 28 and include resistors 38 and 39, terminals 40 and 41, and switches 42 and 43.

An alternate arrangement is shown in connection with terminal 26. In this case, the input signal involves removal of potential of point Q from a circuit when a switch 44 is opened. In this arrangement, the circuit for normally causing the glow extends from point P over terminal 23, conducting layer 22, layer 24, terminal 26, switch 44, and terminal 45, which is connected to point Q of the transformer. When the input signal removes potential of point Q from the circuit (diagrammatically shown as opening switch 44), then the terminal 26 is connected over a 4.7-megohm resistor 46 to a terminal 55, connected to point P, and no current flows in the circuit, causing the glow to cease.

Accordingly, by applying a signal, as by applying a potential of point P as in the circuit to terminals 25, 27, or 28, or as by removing a potential of point Q as in the circuit to terminal 26, a glow can be made to cease in the electroluminescent material of the layer 24.

Glowing of the phosphor layer 24 at the points of connection of the terminals 25 to 28 inclusive thereto causes the photoconductive cells 29 to 32 inclusive, positioned on the other side of the base 21 opposite the terminals 25 to 28 inclusive, to be illuminated, as indicated by thes light paths indicated diagrammatically at 47 in Fig. 1. Illumination of these cells greatly alters their internal electrical resistance. In the circuit shown in Fig. 1, the resistance of the cells varies from approximately 5 megohms per cell, when they are illuminated by radiation from the electroluminescent layer 24, to over 1,000 megohms per cell when they are dark. The ratio of resistance is thus on the order of 1 to 200. It has been found that, by increasing the frequency of the potential applied across the electroluminescent elements, their light output may be greatly increased. The photoconductive cells, when illuminated by this increased amount of light, are caused to assume a state of internal resistance which is considerably smaller than the 5 megohms per call mentioned above, thus greatly increasing the ratio of resistances between light and dark states. This makes possible a higher switching speed, greater reliability, and the use of smaller elements.

The output signal circuit for the "and" gate of Fig. 1 includes two terminals 48 and 49. Any source of potential of any desired value, either A.C. or D.C., may be applied to the terminals. If desired, these terminals may be supplied from the transformer 34. However, for some uses it may be desirable to isolate electrically the input and output circuits for the switching element of Fig. 1, and for such uses a potential source other than the transformer 34 can be employed.

In the circuit of Fig. 1, the photoconductive cells 29 to 32 inclusive are connected in a parallel combination, which is connected in series with a load resistor 50 across the terminals 48 and 49. An output signal line 51 for carrying an output signal from the element 20 to a utilizing device is connected to the circuit between the parallel-connected cells 29 to 32 inclusive and the load resistor 50.

The parallel combination of photoconductive cells together with the load resistor 50 acts as a voltage divider to determine the value of potential on the line 51. When all of the cells 29 to 32 inclusive are illuminated and are in a low resistance state, the equivalent resistance of their parallel combination will be low in comparison with the resistance of the load resistor 50, and the potential on the line 51 will therefore be close to that of the potential at the terminal 48. In fact, so long as any one of the cells 29 to 32 inclusive is illuminated and in a low resistance state, even though the resistances of the other non-illuminated cells are very high, the equivalent resistance of the parallel combination will be low in comparison with that of the load resistor 50, and the potential on the line 51 will be substantially that of the potential at the terminal 48. Only when all of the cells 29 to 32 inclusive are dark and in a high resistance state will the equivalent resistance of the parallel combination exceed that of the load resistor 50, so that the potential on the line 51 will be closer to the value of the potential on the terminal 49 than it is to the potential on the terminal 48.

This is true due to the large difference between the resistance of the photoconductive cells in their illuminated condition and the resistance in the non-illuminated, or dark, condition of the cells, and also due to the fact that all of these photoconductive cells, as has been stated, are connected in a parallel combination, so that their equivalent resistance is expressed by the equation $$\frac{1}{R_{\text{equiv.}}}=\frac{1}{R_1}+\frac{1}{R_2}+\frac{1}{R_3}+\cdots$$

where $R_{\text{equiv.}}$ represents the equivalent resistance of the parallel combination, and $R_1$, $R_2$, $R_3$, etc., are the individual resistances of the various photoconductive cells.

It will be seen from the above that the potential on the signal output line 51 will remain at a value substantially that of the potential applied to the terminal 48 until input signals are simultaneously applied to all of the input terminals 25 to 28 inclusive, causing all of the cells 29 to 32 inclusive to go dark and shift to a high resistance state, at which time the potential on the signal output line 51 will shift from substantially that of the terminal 48 to substantially that of the terminal 49, this being the output signal desired from the element 20 acting as an "and" gate.

In Fig. 1, the lower end of the element 20 is broken away, and an additional terminal 52 and photoconductive cell 53, coupled by a light path 54, are shown mounted in conventional manner at the lower end of the element 20. This has been done to illustrate the possibility of extending the physical construction of the element 20 in either or both of two dimensions to accommodate any desired number of input terminals and corresponding photoconductive cells. An "and" gate or other type of gate may therefore be formed under the teaching of the present invention, having a very large number of individual inputs. An important factor in permitting this is the ratio of difference between the resistance of the photoconductive cells in their illuminated and non-illuminated states, which, it will be recalled, in the present example is stated to be on the order of 1 to 200.

The circuit shown in Fig. 2 includes a plurality of the novel logical circuit elements, in the form of an "and" gate and an "inhibit" gate connected in cascade to an "or" gate, and shows how output from one element may be used as input to another element.

A first circuit element 60 in the circuit of Fig. 2 comprises a base 61 having on one side a conductive layer 62 with a terminal 63 thereon, and having an electroluminescent phosphor layer 64 on the other side of the conductive layer 62. Input terminals 65, 66, and 67 are secured to the electroluminescent phosphor layer 64. On the other side of the base 61 are photoconductive cells 68, 69, and 70, located in registry with the points of connection of the terminals 65, 66, and 67 with the electroluminescent phosphor layer 64, so that they are optically coupled with the respective areas of joinder of the terminals 65, 66, and 67 and the phosphor layer 64. The circuit element 60 serves as an "and" gate in the same manner as does the element 20 of Fig. 1, and the same potential supply points P and Q, which may be of 60-cycle A.C. voltage of approximately 250 volts R.M.S., and the same types of signal input circuits are employed.

In the element 60 of Fig. 2, a separate source of potential is not used for the output side, as was true with the gate of Fig. 1. Here, in Fig. 2, the cells 68, 69, and 70 are connected in parallel combination in series with a resistor 71, of approximately 14.7 megohms resistance, between terminals 72 and 73, connected to the same points P and Q which supply potential to the input side of the element 60. An output signal line 74 is connected to the above circuit at a point 75 between the resistor 71 and the parallel combination of cells 68, 69, and 70.

It will be seen that, with the circuit element 60 in the condition in which it is shown in Fig. 2, all of the cells 68, 69, and 70 are illuminated and in a state of low resistance. Therefore the equivalent resistance of a parallel combination of these cells is relatively low, and the potential at point 75 and on the line 74 is substantially that of the point P. As was previously described in connection with the "and" gate of Fig. 1, the equivalent resistance of the parallel combination of cells 68, 69, and 70 is not substantially altered when one or more of said cells goes dark and shifts to a state of high resistance, until all of said cells have shifted to a high resistance state. Therefore, the equivalent resistance of the parallel combination of cells 68, 69, and 70 will remain low with respect to the resistor 71, and the potential on the point 75 and the line 74 will remain substantially that of the point P, until such time as input signals are simultaneously received at all of the input terminals 65, 66, and 67 of the element 60 to cause all of the cells 68, 69, and 70 to go dark and shift to a high resistance state simultaneously. The equivalent resistance of the parallel combination of cells 68, 69, and 70 will then become relatively high with respect to the resistor 71, and the potential of the point 75 and the line 74 will become substantially that of the point Q. As will be described subsequently, this change of potential of the line 74 is used to control an additional gating element.

A second circuit element 80 in the circuit of Fig. 2 is of the same construction as the element 60, comprising a base 81 having on one side a transparent conductive layer 82 with a terminal 83 thereon, and having an electroluminescent phosphor layer 84 on the layer 82. Input terminals 85, 86, and 87 are secured to the phosphor layer 84. On the other side of the base 81 are photoconductive cells 88, 89, and 90, located in registry with the points of connection of the terminals 85, 86, and 87 with the phosphor layer 84 and optically coupled thereto to respond to radiation produced in the layer 84.

The circuit element 80, with its associated circuitry, serves dual gating functions of coincidence and inhibition. As will be described subsequently, this gate will produce an output signal when an input signal is received at both of the terminals 85 and 86 and no signal is received at the terminal 87. The portion of the element 80 relating to terminals 85 and 86 may therefore be considered to perform an "and" gating function, while that portion of the element 80 relating to the terminal 87 may be considered to perform an inhibitory function.

It is believed that the output effect achieved by various combinations of signals at the various inputs of element 80 may best be shown in the table reproduced below, in which the various input terminals of the element 80 are denoted by their reference characters, and in which an "X" in the horizontal row relating to a particular terminal indicates an input signal at that terminal, while an "O" indicates no input signal. The vertical columns thus form the various combinations of input signals which may occur, and the "yes" or "no" at the bottom of each column indicates whether or not an output signal will result from the combination shown in that column.

*"Coincidence and inhibition" gate*

| Input Signal at Terminal: | | | | | | | | |
|---|---|---|---|---|---|---|---|---|
| 85 | X | X | X | O | O | O | X | O |
| 86 | X | X | O | O | X | O | O | X |
| 87 | X | O | O | O | X | X | X | O |
| Output Signal | No | Yes | No | No | No | No | No | No |

The circuit arrangement by which the element 80 is enabled to perform the switching function tabulated above will now be described. The input portion of the element 80 is operated by the same A.C. voltage employed for operating the element 60, and the element 20 of Fig. 1, and the points P and Q have the same significance. Accrdingly, with the circuit of Fig. 2 in the condition shown and with the terminal 83 connected to a terminal 91, which is connected to point P, and with terminals 92 and 93 connected to point Q, current will flow from point P over terminal 91, terminal 83, through the conductive layer 82 and through two paths in the phosphor layer 84, the terminals 85 and 86, resistors 94 and 95, of approximately 4.7 meghoms resistance, to the terminals 92 and 93, which are connected to point Q. Current through these paths will cause the electroluminescent layer 84 to glow at the points where the terminals 85 and 86 are connected thereto.

The same diagrammatic arrangement for supplying input signals to terminals 85 and 86 as was employed for supplying input signals to terminal 25 in Fig. 1 is shown. This includes the switches 96 and 97, by which the potential of point P can be supplied directly to the terminals 85 and 86 to short out the paths through the phosphor layer 84 and cause it to cease glowing at these points.

A somewhat different arrangement is provided for the terminal 87 for performance of an inhibitory function. In this case, the terminal 87 is connected over an approximately 4.7-megohm resistor 98 to a terminal 99, connected to point P. Since the terminal 83 is connected to the terminal 91, which is connected to point P, there is no potential difference across the path which includes terminal 83, conductive layer 82, phosphor layer 84, terminal 87, resistor 98, and terminal 99. Therefore no current will flow in this path, and the phosphor layer 84 will not glow at its point of connection with the terminal 87, and consequently the photoconductive cell 90 will be in a high resistance condition.

An input signal to provide an inhibitory function may be supplied to the terminal 87. A diagrammatic arrangement for doing this is shown in Fig. 2 as including a switch 100, by which the potential of point Q can be supplied directly to the terminal 87. This produces a potential difference across the layer 84 and the terminal 87, causing the layer to glow at its point of connection to said terminal, and this glow will cause the resistance of the cell 90 to be reduced.

The output side of the element 80 and its associated circuitry is identical to that of the element 60. The photoconductive cells 88, 89, and 90 are connected in parallel combination in series with a resistor 101, of approximately 14.7 megohms resistance, between the terminals 91 and 102, connected to the same points P and Q which supply potential to the input side of the element 80. An output signal line 103 is connected to the above circuit at a point 104 between the resistor 101 and the parallel combination of cells 88, 89, and 90.

The output side of the element 80 functions in the same manner as does the output side of the element 60. When all, or any one or more, of the cells 88, 89, and 90 are illuminated by glowing of the phosphor layer 84, the equivalent resistance of the parallel combination of said cells is relatively low with respect to the resistance of the resistor 101; consequently the potential on the point 104 and the line 103 is substantially that of the point P. However, when all of the cells 88, 89, and 90 are dark, the equivalent resistance of the parallel combination of said cells becomes relatively high with respect to the resistance of the resistor 101, and the potential of the point 104 and the line 103 becomes substantially that of the point Q. As has been previously noted, such a condition takes place only when input signals are simultaneously applied to the input terminals 85 and 86 of the element 80 and when no input signal is applied at this time to terminal 87 of said element. An input signal applied to the terminal 87 performs an inhibiting function and will prevent a substantial change in potential on the line 103 regardless of whether or not input signals are applied to either or both of the terminals 85 and 86. It will be seen that any number of available inputs could be utilized in this manner to perform an inhibiting function.

The change of potential of the line 103 is used in the circuit of Fig. 2 to control an additional gating element, which will now be described.

The lines 74 and 103 are connected to two input terminals 111 and 112, respectively, for a third circuit element 110, which has the same physical structure as the elements 60 and 80 of Fig. 2. A base 113, of glass or other suitable material, has on one side a transparent conductive layer 114, with a terminal 115 thereon. An electroluminescent phosphor layer 116 is positioned on the layer 114 and has the terminals 111 and 112 secured thereto. On the other side of the base 113 are photoconductive cells 117 and 118, located in registry with the points of connection of the terminals 111 and 112 to the electroluminescent phosphor layer 116 and optically coupled thereto.

The circuit element 110, with its associated circuitry, serves the gating function of an "or" gate and will produce an output signal when an input signal is received at either or both of the input terminals 111 and 112.

It is believed that the output effect achieved by various combinations of signals at the various inputs 111 and 112 may best be shown in the table reproduced below, in which the various input terminals of the element 110 are denoted by their reference characters, and in which an "X" in the horizontal row relating to a particular terminal indicates an input signal at that terminal, while an "O" indicates no input signal. The vertical columns thus form the various combinations of signals which may occur, and the "yes" or "no" at the bottom of each column indicates whether or not an output signal will result from the combination shown in that column.

*"Or" gate*

| | | | | |
|---|---|---|---|---|
| Input Signal at Terminal: | | | | |
| 111 | X | X | O | O |
| 112 | X | O | X | O |
| Output Signal | Yes | Yes | Yes | No |

The circuit arrangement by which the element 110 is enabled to perform the switching functions tabulated above will now be described. The terminal 115 on the layer 114 is connected to a terminal 119, connected to the point P. The input circuitry to the terminals 111 and 112 has already been described. As has been stated, the potential on each of the two lines 74 and 103 may be either substantially that of point P, if no input signal is present thereon, or substantially that of point Q, if an input signal is present thereon, depending upon whether or not an output signal has been produced by the elements 60 and 80.

When no output signal is produced by the element 60, the potential on the line 74 is substantially that of point P. Since the terminal 115 is connected to the terminal 119, which is connected to the point P, there is substantially no potential difference across the path which includes the terminal 115, the conductive layer 114, the phosphor layer 116, the terminal 111, and the line 74. Therefore, insufficient current will flow in this path, and the phosphor layer 116 will not be caused to glow at its point of connection with the terminal 111.

However, when an output signal is produced by the element 60, the potential on the line 74 becomes substantially that of point Q, and a potential difference will therefore be produced across the layer 116 and the terminal 111, causing the layer to glow at its point of joinder with the terminal 111.

The operation of the terminal 112 in cooperation with the input line 103 and the phosphor layer 116 is the same as that described above for the terminal 111 with its cooperating line 74 and the layer 116. Therefore it will be seen that, when an output signal is produced by the element 80 acting as a combined coincidence and inhibiting gate, the potential on the line 103 will be substantially that of the point Q, and current will flow through the phosphor layer 116 and the terminal 112 at their point of joinder, causing said phosphor layer to glow at that point. On the other hand, when no output signal is forthcoming from the element 80, the potential on the line 103 will be substantially that of point P, and substantially no current will flow through the phosphor layer 116 and the terminal 112 at their point of joinder, so that the phosphor layer will not glow at that point.

In summary, it is therefore seen that the terminal 111 is related to the element 60 over the line 74, and the phosphor layer 116 will glow at its point of joinder with said terminal when an output signal is produced by the element 60 and its associated circuitry. Similarly, the terminal 112 is related to the element 80 over the line 103, and the phosphor layer 116 will glow at its point of joinder with said terminal 112 when an output signal is produced by the element 80 and its associated circuitry.

On the output side of the circuit element 110, the cells 117 and 118, optically coupled to the terminals 111 and 112, respectively, are connected in parallel combination between the terminal 119 and a point 120, which is connected over a load resistor 122 to a terminal 123, connected to point Q. Point 120 also is connected to an output lead 121. It will be recalled that the terminal 119 is connected to the point P, so that the potential at said terminal is that of point P.

When no output signal is produced by either of the elements 60 or 80, both of the cells 117 and 118 will be dark and in a high resistance state. The equivalent resistance of this parallel combination will therefore be high, and there will be a large potential drop across said resistance, so that the potential at the point 120 and on the output line 121, which leads to some type of utilizing device, will be substantially that of point Q.

On the other hand, when an output signal is produced by either or both of the elements 60 or 80, one or both of the cells 117 and 118 will be illuminated. This greatly lowers the equivalent resistance of the parallel combination of cells 117 and 118, as has been previously explained, and the potential drop across said resistance becomes small, so that the potential at the point 120 and on the output line 121 becomes substantially that of the point P.

An output signal from the element 110 thus takes the form of a change in potential on the line 121 to a value which is substantially that of point P. It will be recalled that the various combinations of input signals at terminals 111 and 112 which produce such an output signal on the line 121 have previously been set forth in tabular form.

The circuit shown in Fig. 2 thus provides a means by which a large number of input signal sources may be so coordinated that certain predetermined combinations of input signals will produce an output signal which may be employed to control the utilizing device, or which may serve as an input signal to still another gating circuit.

It will be obvious that the connection of the elements 60, 80, and 110 in the manner shown in Fig. 2 is only one of a great many possible combinations in which the novel logical circuit elements of the present invention may be employed, and that the gating circuit shown in Fig. 2 may be used either alone or in combination with other gating circuits. Also it will be seen that, if desired, the gating circuit of Fig. 2 may be formed on a single element, rather than the three separate elements 60, 80, and 110, since the same potential, that of point P, is applied to the common conductive layers 62, 82, and 114 of the three elements. Since the elements of the instant invention are small, compact, and easily and inexpensively manufactured, they are ideally suited to uses, such as in computers, in which a large number of logical circuits, having a great many inputs and outputs, are necessary.

While the forms of the invention shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. An electrical switching unit comprising, in combination, a plurality of individually-operable electroluminescent elements to which input signals may be selectively applied, said electroluminescent elements being normally in one of two states, but changing to the other state when an input signal is applied thereto; a corresponding plurality of impedances, each connected to a different one of said electroluminescent elements; means for applying a potential to each combination of an electroluminescent element and its corresponding impedance; signal input means coupled to each electroluminescent element for applying state-changing signals thereto; a corresponding plurality of photoconductive cells, each optically coupled to one of said electroluminescent elements; and an output circuit connecting the cells in parallel combination and across a potential supply, said output circuit further including output means for producing an output signal in the form of a potential change only in response to input signals on predetermined signal input means.

2. An electrical switching unit comprising, in combination, a plurality of individually-operable electroluminescent elements to which input signals may be selectively applied, said electroluminescent elements being capable of assuming either a dark state or a luminescent state, and normally in one of said states, but changing to the other state when an input signal is applied thereto; a corresponding plurality of impedances, each connected to a different one of said electroluminescent elements; means for applying an operating potential across each combination of an electroluminescent element and its corresponding impedance; signal input means connected to the junction of each electroluminescent element and its impedance; a corresponding plurality of photoconductive cells, each optically coupled to one of said electroluminescent elements, the internal resistance of each cell being relatively low when illuminated by its corresponding electroluminescent element, and being relatively high when not illuminated by its corresponding electroluminescent element; and an output circuit connecting the cells in parallel combination and across a potential supply, said output circuit further including output means for producing an output signal in the form of a potential change only in response to input signals on predetermined signal input means.

3. An electrical switching system including a switching unit comprising, in combination, a plurality of individually-operable electroluminescent elements to which input signals may be applied, said electroluminescent elements being capable of assuming either a dark state or a luminescent state, and normally in one of said states, but changing to the other state when an input signal is applied thereto; a corresponding plurality of impedances, each connected to a different one of said electroluminescent elements; means for applying operating potential across each combination of an electroluminescent element and its corresponding impedance; signal input means coupled to each electroluminescent element; a corresponding plurality of photoconductive cells, each optically coupled to one of said electroluminescent elements, the internal resistance of each cell being relatively low when illuminated by its corresponding electroluminescent element, and being relatively high when not illuminated by its corresponding electroluminescent element; an output circuit connecting the cells in parallel combination and including an impedance connected in series with the parallel combination of cells, and further including means for applying potential across the impedance and the parallel combination of cells, and also including output means coupled between the impedance and the parallel combination of cells and producing an output signal in the form of a potential change across said impedance only in response to predetermined input signals; a further switching unit including a further electroluminescent element and a further photoconductive cell coupled to said further electroluminescent element; means coupling the output means of the first-mentioned switching unit to the electroluminescent element of the further switching unit; and means for applying an operating potential across the output means of the first-mentioned switching unit and the electroluminescent element of the further switching unit, the impedance in the output circuit of the first-mentioned switching unit serving as the impedance in the input circuit of the further switching unit, and enabling the operation of the further switching unit to be controlled in accordance with the potential change in the output from the first-mentioned switching unit.

4. An electrical switching unit comprising, in combination, a plurality of individually-operable electroluminescent elements to which input signals may be selectively applied; a corresponding plurality of impedances, each connected to a different one of said electroluminescent elements; means for applying an operating potential across each combination of an electroluminescent element and its corresponding impedance, said electroluminescent elements being normally luminescent due to the potential applied thereacross, but being capable of being extinguished when an input signal is applied thereto; signal input means connected to the junction of each electroluminescent element and its impedance; a corresponding plurality of photoconductive cells optically coupled to the electroluminescent elements, each of said photoconductive cells having a low resistance in its normal illuminated state, and having a high resistance when its corresponding electroluminescent element is extinguished; and an output circuit connecting the photoconductive cells in parallel combination and across a potential supply, said output circuit further including output means for producing an output signal in the form of a potential change only in response to simultaneous input signals on all input circuits.

5. An electrical switching system including a switching unit comprising, in combination, a plurality of individually-operable electroluminescent elements to which input signals may be selectively applied; a corresponding plurality of impedances, each connected to a different one of said electroluminescent elements; means for applying an operating potential across each combination of an electroluminescent element and its corresponding impedance, said electroluminescent elements being normally luminescent due to the potential applied thereacross, but being capable of being extinguished when an input signal is applied thereto; signal input means connected to the junction of each electroluminescent element and its impedance; a corresponding plurality of photoconductive cells optically coupled to the electroluminescent elements, each of said photoconductive cells having a low resistance in its normal illuminated state, and having a high resistance when its corresponding electroluminescent element is extinguished; an output circuit connecting the cells in parallel combination and in series with an impedance across a potential supply, said output circuit producing an output signal in the form of a potential change across said impedance only in response to simultaneous input signals on all input circuits; a further switching unit including a further electroluminescent element and a further photoconductive cell coupled to said further electroluminescent element; and means for applying an operating potential across the impedance in the output circuit of the first-mentioned switching unit and the electroluminescent element of the further switching unit to control the operation of the further switching unit in accordance with the output signal which is produced by simultaneous input signals on all input circuits of the first-mentioned switching unit.

6. An electrical switching unit comprising, in combination, two individually-operable electroluminescent elements to which input signals may selectively be applied, said electroluminescent elements being capable of assuming either a dark state or a luminescent state, and normally in one of said states, but changing to the other state when an input signal is applied thereto; an impedance connected to one of said electroluminescent elements; means for applying an operating potential across the combination of said one of said electroluminescent elements and its impedance, said one of said electroluminescent elements being thereby rendered normally luminescent, but being extinguished when an input signal is applied thereto; signal input means connected to the junction of said one of said electroluminescent elements and its impedance; further signal input means coupled to the other of said electroluminescent elements, said other of said electroluminescent elements being normally in a dark state; means including the further signal input means for causing the other of said electroluminescent elements to assume an illuminated state; corresponding photoconductive cells coupled to each of the electroluminescent elements, the internal resistance of each cell being relatively low when illuminated by its corresponding electroluminescent element and being relatively high when not illuminated by its corresponding electroluminescent element; and an output circuit connecting the cells in parallel combination and across a potential supply, said output circuit further including output means for producing an output signal in the form of a potential change in response to an input signal on the input signal means for said one of said electroluminescent elements, a simultaneous input signal on the input circuit for the other of said electroluminescent elements being effective to prevent an output signal even if an input signal is applied to said one of said electroluminescent elements.

7. An electrical switching system including an electrical switching unit comprising, in combination, two individually-operable electroluminescent elements to which input signals may be selectively applied, said electroluminescent elements being capable of assuming either a dark state or a luminescent state, and normally in one of said states, but changing to the other state when an input signal is applied thereto; an impedance connected to one of said electroluminescent elements; means for applying an operating potential across the combination of said one of said electroluminescent elements and its impedance, said one of said electroluminescent elements being thereby rendered normally luminescent, but being extinguished when an input signal is applied thereto; signal input means connected to the junction of said one of said electroluminescent elements and its impedance; further signal input means coupled to the other of said electroluminescent elements, said other of said electroluminescent elements being normally in a dark state; means including the further signal input means for causing the other of said electroluminescent elements to assume an illuminated state; corresponding photoconductive cells coupled to each of the electroluminescent elements, the internal resistance of each cell being relatively low when illuminated by its corresponding electroluminescent element and being relatively high when not illuminated by its corresponding electroluminescent element; an output circuit connecting the cells in parallel combination and across a potential supply, said output circuit further including output means for producing an output signal in the form of a potential change in response to an input signal on the input signal means for said one of said electroluminescent elements, a simultaneous input signal on the input circuit for the other of said electroluminescent elements being effective to prevent an output signal even if an input signal is applied to said one of said electroluminescent elements; a further switching unit; and means connecting the output means of the first-mentioned switching unit to the further switching unit to control its operation in accordance with the combination of input signals on the input signal means for the various elements of the first-mentioned switching unit.

8. An electrical switching unit comprising, in combination, a plurality of individually-operable electroluminescent elements to which input signals may be selectively applied, said electroluminescent elements being capable of assuming either a dark state or a luminescent state; a corresponding plurality of impedances, each connected to a different one of said electroluminescent elements; means for applying a potential to any combination of an electroluminescent element and its corresponding impedance; signal input means connected to the junction of each electroluminescent element and its impedance, the signal input means each being capable of applying a normal potential level to said junction of such value as to control whether or not a substantial potential difference exists across the corresponding electroluminescent element, to thereby control its normal state, an input signal on the signal input means varying said normal potential level to allow said electroluminescent element to change its state; a corresponding plurality of photoconductive cells, each optically coupled to one of said electroluminescent elements, the internal resistance of each cell being relatively low when illuminated by its corresponding electroluminescent element, and being relatively high when not illuminated by its corresponding electroluminescent element; and an output circuit connecting the cells in parallel combination and across a potential supply, said output circuit further including output means for producing an output signal in the form of a potential change in response to an input signal, comprising a variation in said normal potential level, on predetermined signal input means.

9. A switching circuit for producing an output when an input signal is received at any one or more of a plurality of inputs comprising, in combination, a plurality of terminals; a conducting member; electroluminescent material sandwiched between the terminals and the conducting member; photoconductive means positioned in operative relation to the electroluminescent material; an impedance associated with each terminal; means for applying a potential across each impedance and the corresponding sandwiched electroluminescent material capable of causing light radiation from said material in the area of the selected terminal, said radiation falling upon a corresponding area of the photoconductive means to produce a localized change in the electrical resistance of said means; and signal input means coupled to each terminal and normally applying potential to said terminal of such a level as to substantially eliminate any potential difference across the sandwiched electroluminescent material to thereby prevent radiation from said material, an input signal on said signal input means varying said normal potential level to allow said electroluminescent material to produce light radiation; said corresponding areas of the photoconductive means being incorporated in an output circuit, also including an output signal means, a change in resistance of any of the corresponding areas of the photoconductive means in response to an input signal on any of the input signal means being effective to produce a change in output on the output signal means.

10. A switching circuit for producing an output when an input signal is simultaneously received at all of a plurality of inputs, comprising, in combination, a plurality of input terminals; a conducting member; a layer of electroluminescent material sandwiched between and connected to the input terminals and the conducting member; a plurality of photoconductive elements, one positioned adjacent the electroluminescent material at each point of connection of said material to one of the input terminals; input means for applying a potential difference at the input terminals and the conducting member across the sandwiched layer of electroluminescent material to cause light radiation by said material at each of the points of connection of said material to one of said terminals, said radiation falling upon the photoconductive elements to cause a state of relatively low electrical resistance in said elements; a signal output means; an output load resistor; means for connecting said photoconductive elements in parallel combination and in series with the output load resistor, and for connecting the signal output means between the parallel combination and the load resistor; means for applying a potential across the parallel combination and the load resistor; and inhibiting means connected to each of the input terminals and operable to alter the potential difference across the electroluminescent material to cut off radiation by said material, whereby, when all of the inhibiting means are operated simultaneously, radiation to all of the photoconductive elements is cut off and all of said elements change to a state of relatively high resistance to vary the potential at the signal output means.

11. An electrical switching unit comprising, in combination, a plurality of individually-operable electroluminescent elements to which input signals may be applied; means for applying a first operating potential across a first group of said elements; said electroluminescent elements being normally luminescent, but being extinguished when an input signal is applied thereto; means for applying a second operating potential across a second group of at least one of said elements, said second group being normally dark, but luminescing when an input signal is applied thereto; an input circuit for each element; a corresponding plurality of variable resistance photoconductive cells optically coupled to the electroluminescent elements; and an output circuit connecting the cells in parallel combination and in series with a load resistor across a potential supply, and including means for applying potential across the load resistor and the parallel combination of cells, and also including an output conductor connected between the load resistor and the parallel combination of cells, and producing an output in the form of a voltage change only in response to simultaneous input signals on all input circuits for the first group of said elements when no input signal is applied to any of the second group of said elements, a simultaneous input signal on the input circuit for any one of the second group of elements being effective to prevent an output signal even when input signals are applied simultaneously to the input circuits for each of the elements in the first group.

12. An electrical switching system, including a switching unit comprising, in combination, a plurality of individually operable electroluminescent elements to which input signals may be applied; means for applying a first operating potential across a first group of said elements; said electroluminescent elements being normally luminescent, but being extinguished when an input signal is applied thereto; means for applying a second operating potential across a second group of at least one of said elements, said second group being normally dark, but luminescing when an input signal is applied thereto; an input circuit for each element; a corresponding plurality of variable resistance photoconductive cells optically coupled to the electroluminescent elements; an output circuit connecting the cells in parallel combination and in series with a load resistor across a potential supply, and including means for applying potential across the load resistor and the parallel combination of cells, and also including an output conductor connected between the load resistor and the parallel combination of cells and producing an output in the form of a voltage change only in response to simultaneous input signals on all input circuits for the first group of said elements when no input signal is applied to any of the second group of said elements, a simultaneous input signal on the input circuit for any one of the second group of elements being effective to prevent an output signal even when input signals are applied simultaneously to the input circuits for each of the elements in the first group; a further switching unit; and means connecting the output conductor of the first-mentioned switching unit to the further switching unit to control its operation in accordance with the input signals applied to the first and second groups of electroluminescent elements.

13. A switching circuit for producing an output signal in response to predetermined combinations of input signals, comprising, in combination, a plurality of coincidence terminals; an inhibiting terminal; a conducting member; an electroluminescent member sandwiched between all of said terminals on one side and the conducting member on the other side; a plurality of photoconductive means positioned opposite related ones of said terminals in optically-coupled relation to the electroluminescent member; input supply means for supplying a potential difference between selected ones of the coincidence terminals and the conducting member to cause light radiation from said electroluminescent member in the areas of the selected terminals, said radiation falling upon corresponding photoconductive means to produce localized changes in the electrical resistance of said means; input signal means capable of nullifying the potential difference between said coincidence terminals and said conducting member; additional input signal means capable of producing a potential difference between the inhibiting terminal and the conducting member to cause light radiation from the electroluminescent member in the area of the inhibiting terminal, said radiation falling upon a corresponding photoconductive means to produce a localized change in the electrical resistance of said means; an output circuit, including a load resistor, signal output means, and a parallel combination of the various photoconductive means; and means for supplying an output potential to said output circuit, whereby simultaneous input signals to all of the coincidence terminals cause the equivalent resistance of the parallel combination of the related photoconductive means to produce a change in potential at the output signal means, and whereby an input signal to the inhibitory terminal prevents such a change in the equivalent resistance of the parallel combination of said photoconductive means, and therefore prevents a change in potential on the output signal means.

14. A switching circuit for producing an output signal in response to predetermined combinations of input signals, comprising, in combination, a plurality of sources of input signals; first and second gating means, each associated with certain of said sources of input signals and each including electroluminescent control means operable by the input signals, photoconductive means controlled by the electroluminescent means, and signal output means controlled by the photoconductive means; and further gating means associated with the signal output means of the first and second gating means and having electroluminescent control means operable by the signal output means of the first and second gating means, photoconductive means controlled by the further electroluminescent means, and signal output means controlled by the last-mentioned photoconductive means, whereby an output signal from the switching circuit is produced in response to input signals from said input signal sources.

15. A switching circuit for producing an output signal in response to predetermined combinations of input signals, comprising, in combination, a first group of photoconductive elements connected in a first parallel combination; a first group of electro-optical means individually responsive to input signals for controlling the equivalent resistance of the first parallel combination; a first load resistor in series with the parallel combination; a first signal means connected between the first parallel combination and the first load resistor; a second group of photoconductive elements connected in a second parallel combination; a second group of electro-optical means individually responsive to input signals for controlling the equivalent resistance of the second parallel combination; a second load resistor in series with the second parallel combination; a second signal means connected between the second parallel combination and the second load resistor; potential supply means connected across the first and second sets of the parallel combinations in series with the load resistors to enable signals to be produced on the first and second signal means under control of the first and second electro-optical means; a third group of photoconductive elements connected in a third parallel combination; a third group of electro-optical means for controlling the equivalent resistance of the third parallel combination, said electro-optical means of the third group being connected to the first and second signal means, and being controlled by signals thereon; and an output signal means in series with the third parallel combination, the potential also being applied to the third parallel combination and the output signal means, so that variation in the equivalent resistance of the third parallel combination, under control of the third group of electro-optical means, produces changes in the potential on the output signal means.

References Cited in the file of this patent

Tomlinson: "Principles of the Light-Amplifier and Allied Devices," Journal of British I.R.E., March 1957, pages 141 to 154.

Mellon Institute of Industrial Research, Quarterly Report No. 3, Second Series of the "Computer Components Fellowship No. 347," pages I–22, I–23, Figs. 7 and 8, dated June 30, 1954.